Sept. 23, 1958 J. F. BRINSTER ET AL 2,853,235

BINARY DIGIT MULTIPLIER CIRCUIT

Filed Nov. 20, 1952 3 Sheets-Sheet 1

INVENTORS
JOHN F. BRINSTER
HOMER M. HILL, JR.
ERWIN DONATH
BY Ralph K. Bonell
AGENT Sept. 23, 1958 J. F. BRINSTER ET AL 2,853,235

BINARY DIGIT MULTIPLIER CIRCUIT

Filed Nov. 20, 1952 3 Sheets-Sheet 2

INVENTORS
JOHN F. BRINSTER
HOMER M. HILL, JR.
ERWIN DONATH
BY Ralph K. Bonell
AGENT

BINARY DIGIT MULTIPLIER CIRCUIT

Filed Nov. 20, 1952 3 Sheets-Sheet 3

INVENTORS
JOHN F. BRINSTER
HOMER M. HILL, JR.
ERWIN DONATH
BY Ralph K. Bonell
AGENT 2,853,235
Patented Sept. 23, 1958

2,853,235

BINARY DIGIT MULTIPLIER CIRCUIT

John F. Brinster, Homer M. Hill, Jr., and Erwin Donath, Princeton, N. J., assignors to Applied Science Corporation of Princeton, Princeton, N. J., a corporation of New Jersey Application November 20, 1952, Serial No. 321,704
10 Claims. (Cl. 235—61)

This invention relates to means such as are employed in digital computers and the like for counting electrical and other impulses. More particularly, it refers to counting means having improved storage and read-out arrangements, and to the method of operation thereof.

It is an object of the invention to provide improved means for registering a count of a sequence of electrical or other impulses applied as an input thereto and for reading out or transferring the count to other means after storage for an indefinite period.

Another object is to provide simple and rapidly operable means for reading out a count stored in a binary counter having successive stages of bi-stable circuits.

Another object is to provide an improved method of reading out a count stored in a binary counter having successive stages of bi-stable circuits which utilizes the numerical transformation corresponding to a change of state of all said stages.

Another object is to provide a method of and means for rapidly reading out a count stored in a binary counter and immediately and automatically thereafter re-setting the counter to zero.

Another object is to provide an improved method of and means for measuring a count stored in a binary counter as a time interval and for adjusting the scale thereof.

Another object is to provide an improved method of and means for the additional and subtraction of electrical impulses, particularly at high frequencies.

Another object is to provide an improved electronic digital multiplier having intermediate storage means.

A further object is to provide an improved method of and means for multiplication based on the use of complementary numbers in a binary system.

Other objects and advantages of the invention will be apparent upon consideration of the following specification taken in connection with the appended drawings in which.

Figure 3:
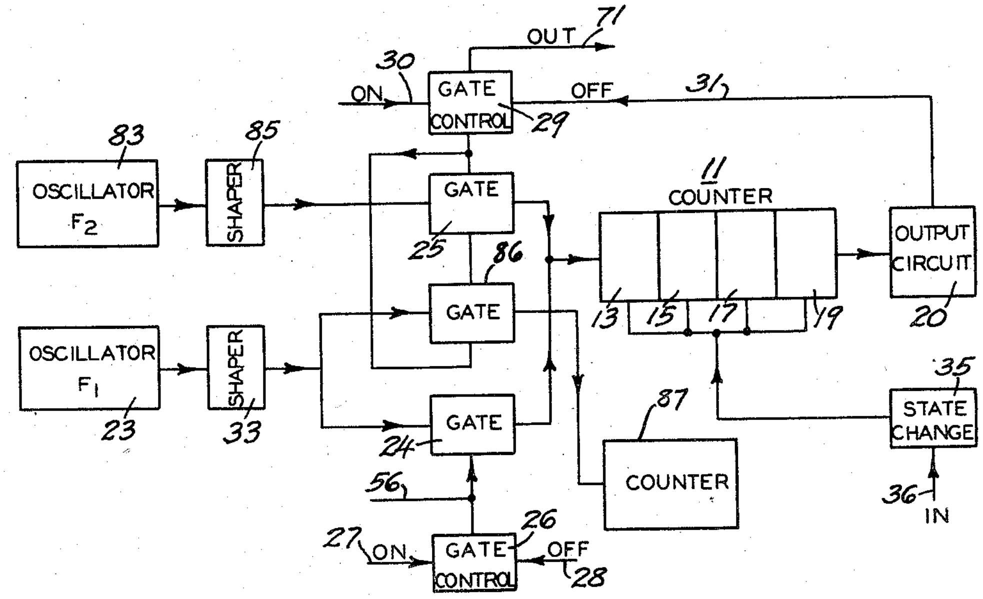
Fig. 3 is a block diagram showing a modification of the circuit of Fig. 1.
Figures 2, 3:
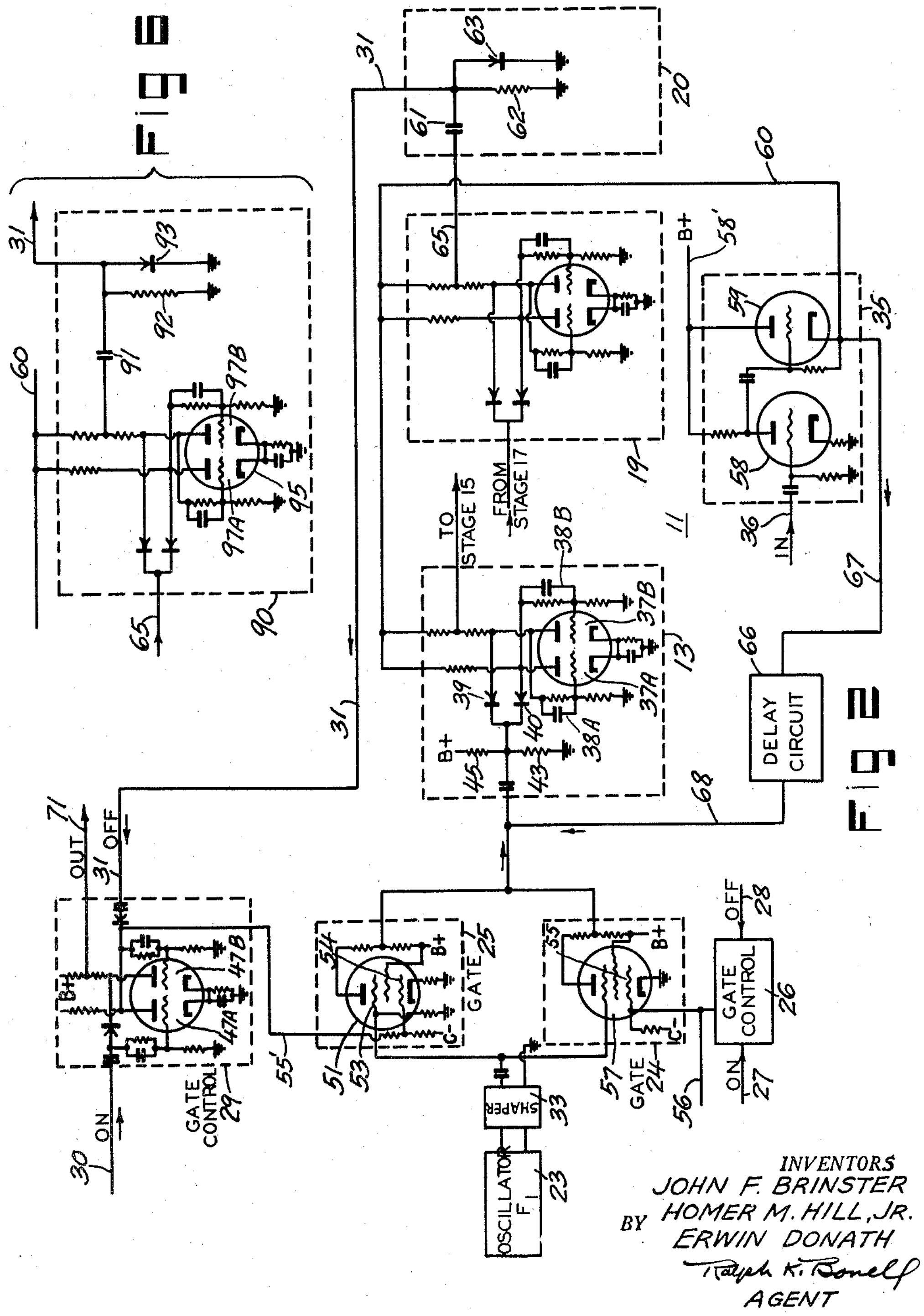
Fig. 2 is a circuit diagram, partly in block form, illustrating the invention and showing certain of the features of the circuit of Fig. 1 in detail, together with additions thereto.
Figure 4A:
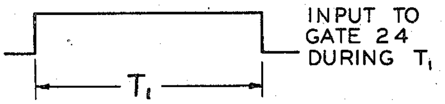
Figure 4B:
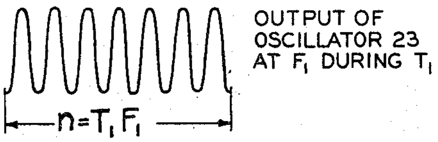
Figure 4C:
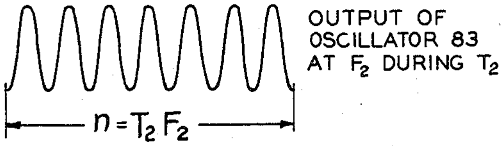
Figure 4D:
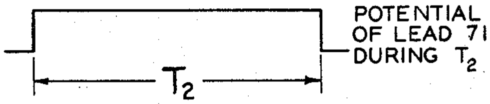
Figure 4E:
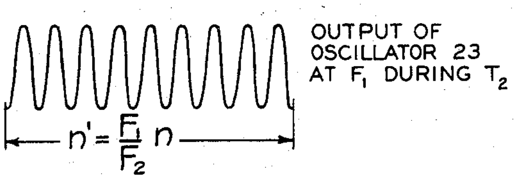
Figure 5A:
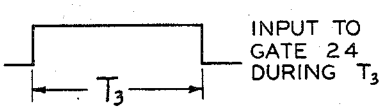
Figure 5B:
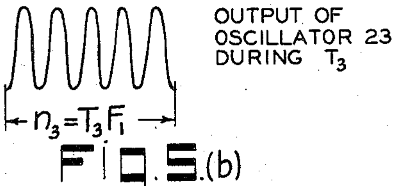
Figure 5C:
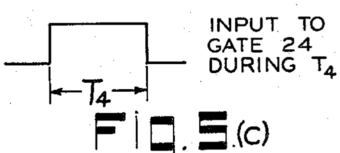
Figure 5D:
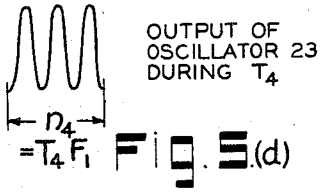
Figure 5E:
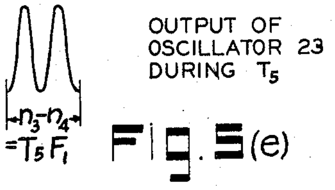
Figure 5F:
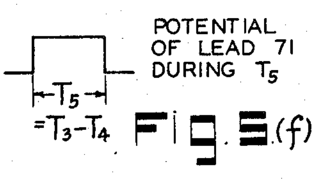

Figs. 4(*a*) to 4(*e*) incl. are graphs illustrating one manner of operation of the invention;

Figs. 5(*a*) to 5(*f*) incl. are graphs illustrating another manner of operation of the invention, and Fig. 6 is a fractional circuit diagram showing a modification of a portion of the circuit of Fig. 2.

The circuit means and method of operation of the invention comprise improvements in known counting or computing means and known methods of operation thereof. As an example of known means, a commonly used counter employs a chain of bi-stable circuits, incorporating electronic or electromagnetic elements, to register a count of applied electrical impulses as a binary number, that is a number the unit values of whose places are in accordance with the respective powers of the number two, instead of in accordance with powers of the number ten, the base in the common decimal system. The term bi-stable circuit, as used herein, refers to a type of circuit sometimes known as a "scale of two" or "flip-flop," capable of existing in either of two stable operating states and operable from one state to the other, usually by the application of an electrical impulse of a selected character. The well-known Eccles-Jordan circuit is representative of such arrangements. In its use in a binary counter, the two operating states of the bi-stable circuit represent, respectively, the alternative digits appearing in each place of a binary number. Counters of heretofore known types employing bi-stable circuits are described, among other places, in the book "Electronics" by Elmore and Sands. Briefly, their manner of operation is as follows:

At the start of a count the circuits of all counter stages are in the same state which, for convenience, may be termed the unoperated state, and to which may be assigned the role of representing the binary digit zero. The number registered by the counter, therefore, is itself zero. Upon the reception of a sequence of input impulses of suitable character various of the stages are changed to their operated state, representing the binary digit unity, thereby producing a pattern of unoperated and operated states, that is, a sequence of zeros and ones which can be interpreted as the count of the applied impulses in binary notation. The count thus registered by the counter is said to be "read in." The count may be recognized, for example, by a display of lamps associated, respectively, with the counter stages, the lamps being illuminated or non-illuminated in correspondence with the states of these stages. If the registered count is materialized by means external to the counter or is transferred to another device, it is said to be "read out" of the counter. After completing a counting operation the counter may be re-set to zero in preparation for the next operation.

The improved circuit means and method of operation of the invention provide for reading out a count stored in a binary counter by first transforming the count into its complementary number with respect to the capacity of the counter, that is, into the number which is the difference between the largest number that can be registered by the counter and the stored count. As will be demonstrated later, this transformation can be made in the counter by a change of state of all stages, that is, a change of state of the bi-stable circuits thereof. Having accomplished this transformation there is applied to the input of the counter an additional numer of impulses sufficient to cause it to reach its counting capacity. The additional impulses thus read into the counter are equal in number to the original count, as will be apparent, and a measure or materialization of this number is a measure of the count, which may thus be read out of the counter. Upon the completion of read-out the counter is automatically re-set to zero without any additional operation being required. In certain modifications of the invention a scale change or multiplication is effected concurrently with or succeeding read-out and in others an addition or subtraction is performed.

The general state change of the counter and the application of additional input impulses to effect read-out may be accomplished at any time after the original count has been registered, thus permitting initial or intermediate storage of a count for an indefinite period. Read-out may be controlled manually or may take place automatically in dependence upon a selected event. Since the number of impulses for effecting read-out is no is no greater than the original count, there is a saving in read-out time over other arrangements requiring the operation of the counter to capacity, or beyond, for read-out purposes, in the frequently occurring situation where the count is less than half the total capacity of the counter.

Figure 1:
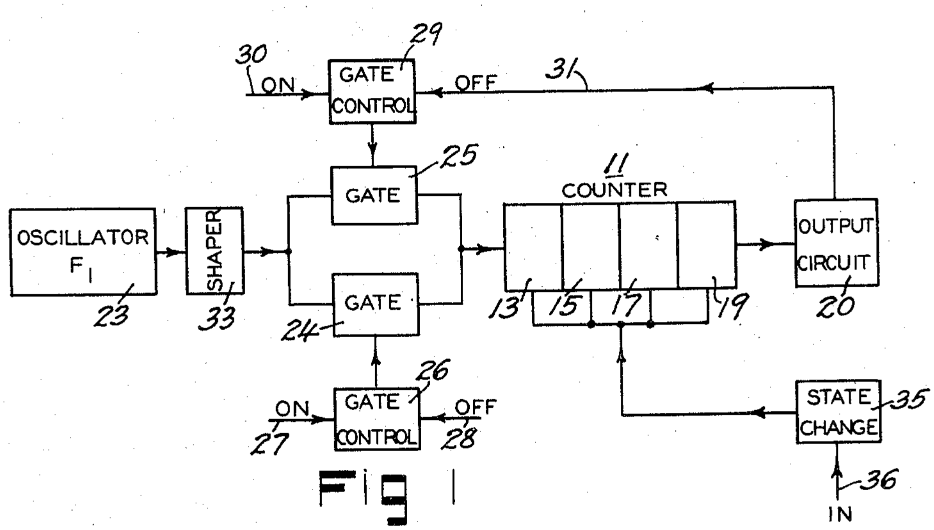
Fig. 1 is a simplified block diagram of an improved counting circuit, in accordance with the principles of the invention.

Referring, now, more particularly to Fig. 1 as exemplifying a simplified arrangement of the invention, there is shown in the form of a block diagram a binary counter 11 having four counting stages, 13, 15, 17 and 19, respectively, corresponding in circuit position to the places of a four-place binary number, and capable of registering a maximum count of $2^4-1$ or 15, excluding zero as a count. Each stage may comprise a bi-stable circuit, such as a version of the Eccles-Jordan circuit, incorporating electronic elements, more fully shown in Fig. 2, operable from one stable state to the other in response to a negative trigger impulse and adapted, in turn, to supply an output impulse suitable for actuating a succeeding stage (or for actuating an output circuit 20 in the case of stage 19) when changing from its operated to its unoperated state, that is, when changing its digital value from one to zero, as herein defined. While described, by way of example, as employing electronic means, the invention is not limited to the use of such means in the counting or other stages, known ferro-resonant and transistor flip-flops, among others, being suitable as bi-stable elements.

A source of impulses to be counted, exemplified by oscillator 23, which may be of conventional design, supplies waves at a constant frequency of $F_1$ cycles per second. The duration $T_1$ of a wave train supplied to counter 11 by oscillator 23, and hence the number of waves therein, may be regulated by either of electronic gate circuits 24 or 25. When discrete "on" and "off" impulses are employed, gate control 26, having "on" and "off" leads 27 and 28, respectively, may be used to govern the duration of the open and closed periods of gate 24 while gate control 29, having "on" and "off" leads 30 and 31, respectively, may be used to govern the operation of gate 25. Other means for controlling at least one of the gates will be described hereinafter. If desirable, the output waves of oscillator 23 may be modified in form by shaping means 33 to obtain impulses of a preferred wave form for operating counter 11. It will be understood that the waves or impulses to be counted may originate in means other than an oscillator and may be of suitable form for direct application to counter 11.

State change means 35 when actuated by a signal on "in" lead 36, in accordance with the principles of operation of the invention, is adapted to supply impulses individually to the four stages of counter 11, suitable for producing a simultaneous change of state of all stages. Output circuit 20 includes means for receiving and shaping an output impulse from counter 11, under conditions to be described, and passing it on to gate control 29 to govern the operation thereof.

Fig. 2 shows the arrangements of Fig. 1 in more detail, with certain additions thereto. Stage 13, representative of the four counting stages, is shown as an Eccles-Jordan circuit insofar as it includes a pair of triodes 37A, 37B, which may be enclosed in a single envelope, with grid-plate cross-coupling circuits 38A, 38B, having suitable time constants for the manner of operation desired, and a pair of rectifying elements 39, 40, for passing negative impulses, only, to the plate circuits of 37A and 37B. The operating bias of rectifiers 39, 40 may be derived from the common plate supply by means of potential divider 43, 45.

The two stable operating states of stage 13 are characterized, respectively, by current conduction through triode 37A or 37B, with no conduction through the other triode of the pair. It will be assumed that in the herein termed "unoperated" state 37A is non-conducting and that in the "operated" state this triode is conducting.

Gate controls 26 and 29 are similar flip-flop circuits. Gate control 29, shown in detail, includes triodes 47A and 47B, illustrated as enclosed in a single envelope, with suitable grid-plate cross-coupling. A negative impulse applied to "on" lead 30 causes triode 47B to conduct, representing one stable operating state, and a similar impulse applied to "off" lead 31 causes triode 47A to conduct, representing the other operating state.

Gates 24 and 25 are conventional gating circuits, each comprising a pentode, as pentode 51. Grid 53, the No. 3 grid of pentode 51, is connected to oscillator 23 by way of shaper 33 while grid 54, the No. 1 or control grid, is connected to the plate of triode 47A of gate control 29 and to a negative biasing potential. With triode 47A in a non-conducting state, normally initiated by the occurrence of a suitable impulse on "on" lead 30, a relatively high positive potential is applied to grid 54 of pentode 51 by way of lead 55' which, if of suitable amplitude, overcomes the negative bias thereon to a sufficient degree to allow transmission through the tube from oscillator 23 to counter 11. Otherwise, when gate control 29 is in the state in which 47A is conducting, normally initiated by a suitable impulse on "off" lead 31, the negative bias on grid 54 is high enough to prevent transmission through gate 25.

An alternate means of control is shown for gate 24 comprising lead 56 connected to the control grid 55 of pentode 57, corresponding in function to grid 54 of pentode 51. A positive impulse applied to this lead will hold gate 24 open for the duration of the impulse, only, by overcoming the bias on grid 55, in distinction to the "on" and "off" impulses required to operate the flip-flop circuits of gate controls 26 and 29.

State change means 35 comprises triode 58 functioning as a voltage amplifier and triode 59 functioning as a cathode follower. The cathode circuit of triode 59 includes lead 60 and the plate circuits of all tubes in counting stages 13, 15, 17 and 19, connected thereto in parallel. Plate potentials are supplied by way of lead 58' under the control of cathode follower 59. Output circuit 20 is illustrated as a differentiating-rectifying circuit, comprising series condenser 61, shunt resistor 62 and rectifier 63, adapted to supply a sharply peaked unidirectional impulse to "off" lead 31 of gate control 29 when actuated by an output impulse from counting stage 19 by way of lead 65.

In operation, suppose that with counter 11 in its zero condition a suitable impulse applied to "on" lead 27 of gate control 26 causes this control to open gate 24 by supplying a positive impulse thereto for a period sufficient to allow *n* waves, only, to pass from oscillator 23 to counter 11, the completion of this period being determined by the occurrence of a terminating impulse on "off" lead 28. By way of example and for simplicity of explanation, *n* at first will be assumed to have the value of five, although a much higher value usually will be involved.

Through the operation of rectifiers 39, 40, the first wave reaching counter 11 causes negative impulses to appear in the plate circuits of triodes 37A and 37B, thereby, in known manner, causing a change of state of first counting stage 13, wherein initially conducting triode 37B ceases to conduct and conduction occurs in initially non-conducting triode 37A. In its role of representing the first or right hand place of a binary number, stage 13 has changed its digital value from zero to one. It will be noted that, to conform to the usual convention in circuit diagrams, the counting stages in the drawing progress from left to right, whereas increase in place value of a number is in reverse order.

The second of the train of five waves causes stage 13 to revert to its initial state and with the accompanying transition of triode 37B from a non-conducting to a conducting condition a negative impulse is transmitted to succeeding stage 15, generally similar to stage 13, causing a change of state of this stage, and so on. At the end of the wave train the states of the counting stages are such that binary counter 11 registers 0101. This is read as the number five, the respective unit values of the place of the binary number, from right to left, being in accordance with increasing powers of the number two, commencing with the zero power, and the digits appearing in the several places operating as the respective multipliers thereof.

The count of five now being stored in the counter, it may, in accordance with the principles of the invention, be read out at any time in the following manner:

A positive impulse is applied to the control grid of tube 58 by way of "in" lead 36 causing a negative impulse to appear in the plate circuit of that tube which is passed by cathode follower 59, by way of lead 60, to the plate circuits of triodes 37A and 37B of counting stage 13 and to the plate circuits of the corresponding tubes of stages 15, 17, and 19. Assuming that they are of suitable amplitude, the application of these impulses to the plates of triodes 37A and 37B causes a change of state of stage 13, as in the counting process, wherein whichever of triodes 37A, 37B is conducting ceases to conduct and conduction occurs in the other of the pair. Like impulses appearing in the plate circuits of the tubes in stages 15, 17, and 19, by virtue of their parallel connection to lead 60 in the cathode circuit of tube 59, cause a change of state of each of these stages, all counting stages being thus simultaneously reversed as to state.

Since each counting stage has changed state, the respective digits in the binary number registered assume their alternate values and counter 11 now registers 1010, which is read as the number ten. This number may be termed the complement of the count with respect to the capacity of the counter, that is, it is the difference between the counting capacity, fifteen, and the count, five. If, now, additional impulses are supplied to the input of the counter through the opening of gate 25 under the control of gate control 29, the first five of such impulses will cause the number registered to pass successively through the following binary values: 1011, 1100, 1101, 1110, and 1111, the last being the number fifteen. The next succeeding impulse will change the indicated value of each stage to zero and, in the case of stage 19, this operation will supply a negative impulse or signal to output circuit 20. The resulting shaped output of circuit 20 applied to gate control 29 by way of lead 31 causes this control automatically to shut off gate 25, in the manner previously described. The counter immediately and automatically is reset to zero after passing its maximum count and is ready to start a new count without any further operation being required, thus operating in a cyclical manner.

The original count of five, as will be apparent from the foregoing description of the read-out operation, according to one criterion may be measured by the number of impulses, after a general state change, which must be supplied to counter 11 to cause it to reach its counting capacity, in the case of the present example, fifteen, excluding zero as a count. Alternatively, the count may be measured as one less than the number of impulses required, after a general state change, to produce an output impulse or signal from the last stage of the counter.

Both of the above criteria are measures of the difference between the counting capacity of the counter and the number registered after the general state change. While capacity registration may be recognized directly, the use of an output impulse as an indication of the completion of the read-out process, or as the controlling factor thereof, is a preferred method of operation because of the simplicity of the circuit arrangements involved. When the count runs to large numbers, such an indication or control is satisfactory for direct use without subtraction of one unit from the count, this being of negligible significance. Compensation for the additional unit, however, may be effected, in accordance with the principles of the invention, as follows:

A delay circuit 66 is provided, connected to receive an input from the cathode circuit of cathode follower 59 by way of lead 67 and to supply an output impulse by way of lead 68 to the input of counter 11, suitable for actuating said counter in the manner of an impulse received from oscillator 23. At the time a general state change of the counter is brought about by the occurrence of a negative impulse on lead 60 in the cathode circuit of cathode follower 59, a negative impulse is also applied to lead 67. The delay time of circuit 66 is so selected that the resulting output impulse therefrom does not appear on lead 68 and hence does not reach counter 11 until after the state change of the counter has been completed. The effect on the counter, therefore, is to add one unit to the complement of the count, the complement being the number registered by the counter after the general state change. Thus, when gate 25 is opened to read out the count it will take only five impulses, the exact value of the count in the present example, to cause the counter to pass its counting capacity by one unit and supply a single impulse to output circuit 20, instead of six impulses as would be the case if means 66, 67, 68, were not employed. The addition of one unit to the complement operates to subtract one unit from the number which otherwise would be read out, and this principle is further utilized in a modification of the invention hereinafter described:

Instead of discrete "on" and "off" impulses applied to leads 27 and 28, respectively, the duration of the open period of gate 24 may be determined by the duration of a positive impulse of suitable amplitude applied to lead 56, and to the control grid 55 of pentode 57, thus permitting a count to be read into the counter by utilizing a train of waves from oscillator 23 having the duration of a single impulse and thereby corresponding to a selected time interval.

The count read out of the counter may, in turn, be materialized as a wave or impulse of appropriate duration, as well as a number. For this purpose there is provided a lead 71 connected to the plate circuit of triode 47B of gate control 29. During the "off" period of the gate control when triode 47B is conducting, a relatively low potential is applied to lead 71 while during the "on" period when this triode is non-conducting, a relatively high potential is applied thereto. Thus, the variations in the potential of lead 71 define a rectangular wave or impulse whose duration, or width measured along the time axis, corresponds to the interval between "on" and "off" impulses on leads 30 and 31, respectively, above referred to, and hence may be considered an alternate materialization of the count.

It is not necessary that the count be read out of counter 11 by the application of impulses or waves at the frequency $F_1$ of oscillator 23 at which they were read in. In accordance with the principles of the invention, a sequence of impulses occurring at any frequency or at irregular intervals can be employed. The employment of a read-out frequency different from the read-in frequency permits effecting a change of scale or multiplication in connection with the read-out process which is utilized in certain modifications of the invention described below. This principle also is useful in some applications were high counting rates are employed to allow the repetition rate of the read-out impulses to be lowered sufficiently to permit their registration by mechanical counting means or by an interval timer having a relatively slow operating time.

In the circuit modification of Figure 3, in addition to oscillator 23 of Figure 1, there is shown a second oscillator 83. Oscillators 23 and 83 are connected to gate circuits 24 and 25 by way of shaping circuits 33 and 85, respectively. Oscillator 23, as before, is adapted to supply waves at a frequency $F_1$ while oscillator 83 supplies waves at a different frequency $F_2$.

In following the operation of this modification of the invention let it be assumed first that the application of a positive impulse of duration $T_1$ to lead 56 has permitted a train of $n$ waves at the frequency $F_1$ of oscillator 23 to reach counter 11 by way of gate 24 and to be stored thereby, $n$ being equal to $F_1T_1$. The read-in time, $T_1$ is therefore equal to $$\frac{n}{F_1}$$

After a general state change the application of a suitable read-out command impulse to "on" lead 30 of gate control 29 opens gate 25 and allows $n$ impulses at frequency $F_2$ to reach the counter from oscillator 83, completion of read-out preferably being governed, according to one method of operation, by the occurrence of an impulse on "off" lead 31 of gate control 29, supplied by output circuit 20 upon the reception by counter 11 of the next unit input after it has reached its counting capacity, as has been hereinbefore described. The read-out time $T_2$ is equal to $$\frac{n}{F_2}$$

or to $$T_1\frac{F_1}{F_2}$$

$n$ being equal to $T_2F_2$. Therefore, a change of scale along the time axis proportional to $$\frac{F_1}{F_2}$$

has been effected concurrently with read-out. This ratio may be considered a multiplying factor, and, as is shown below, it may be applied to the count $n$ as well as to the read-in time $T_1$, by the use of suitable circuit means. Moreover, the second frequency $F_2$ may be viewed as the quotient of the first frequency $F_1$ divided by the multiplying factor $$\frac{F_1}{F_2}$$

The product $$T_1\frac{F_1}{F_2}$$

being measured in units of time, it may be materialized as a rectangular pulse or wave having a duration defined by the variations of potential of lead 71. The relationships inherent in this method of scale adjustment or multiplication may be visualized more readily by reference to the graphs of Figs. 4(*a*) to 4(*d*) inclusive.

Fig. 4(*a*) shows a rectangular wave having a duration or width along the time axis of $T_1$. Applied to lead 56 as an input to gate 24, this wave will permit a train of waves at a frequency $F_1$ to pass from oscillator 23 to counter 11 for storage thereby, the duration of the train being $T_1$ and the number of waves in the train being $n$, as shown in Fig. 4(*b*). Read-out is accomplished at a frequency $F_2$, in this case considered to be less than $F_1$. The read-out wave train, supplied by oscillator 83, is shown in Fig. 4(*c*) and the corresponding output wave on lead 71, having a width of $T_2$, the read-out time, is shown in Fig. 4(*d*).

To effect a digital multiplication of the count $n$, that is, to apply the multiplying factor $$\frac{F_1}{F_2}$$

thereto, gate control 29 is caused to govern the opening of a third gate 86 simultaneously with gate 25, thereby allowing waves at a frequency $F_1$ to pass from oscillator 23 to a second counter 87, or other circuit means, during the read-out time $T_2$. The number of waves or impulses $n$ connected during this time is $F_1T_2$ or $$\frac{F_1}{F_2}n$$

This, therefore, is a materialization of a number $n'$ equal to the original count $n$ multiplied by the factor $$\frac{F_1}{F_2}$$

as shown graphically in Fig. 4(*e*).

As has been referred to above, an addition to the stored complement of a count results in the subtraction of a like number from the count as read out of the counter, or in a partial reversal of the counter. In accordance with the principles of the invention, one method for carrying out such a subtraction process is as follows:

Referring to the graphs of Figs. 5(*a*) to 5(*f*), incl., a positive pulse or wave of duration $T_3$, as shown in Fig. 5(*a*), is applied to lead 56 (Fig. 2) will hold gate 24 open for a corresponding period. During this period oscillator 23 supplies to counter 11 a train of waves equal in number to $T_3F_1$, as illustrated in Fig. 5(*b*), which number is stored thereby. Let this number, designated $n_3$, be considered the minuend. When a general state change of counter 11 is brought about, in a described manner, the complement of $n_3$ with respect to the counting capacity $n_c$ of the counter, that is the number $n_c-n_3$, is registered. If now a positive pulse of duration $T_4$ less than $T_3$, Fig. 5(*c*), is applied to lead 56, during the period gate 24 is held open thereby, oscillator 23 supplies to counter 11 $T_4F_1$ waves, Fig. 5(*d*). Let this be the subtrahend, $n_4$. If, in accordance with described read-out procedure, gate 25 is opened by the application of a suitable impulse to "on" lead 30 of gate control 29, a sequence of additional waves will be supplied to the counter causing it to reach its counting capacity. (Whether capacity registration is recognized directly or an extra impulse is used to terminate read-out, as hereinbefore described, is immaterial to the presently described manner of operation.) The number of waves in this last sequence is $n_c-(n_c-n_3+n_4)$, or the difference, $n_3-n_4$, Fig. 5(*e*). A pulse or wave having a duration $T_5$ corresponding to this difference appears on lead 71 and is shown in Fig. 5(*f*). $T_5$ is equal to $T_3-T_4$.

The process of addition is readily accomplished with the described means of the present invention, the two numbers to be added merely being read into the counter in sequence before state change and read-out occur. Their sum will then be stored by the counter and can be read out at any time in the described manner. When read-in is governed by the application of an impulse of suitable duration to lead 56, thereby to control gate 24, and the sum of the two inputs read out of counter 11 is materialized as an impulse or wave on lead 71, associated with gate control 29, the addition of time intervals is accomplished.

In Fig. 6 there is shown a modification of output circuit 20, referenced as output circuit 90. The latter circuit is adapted to receive an impulse from last counting stage 19 of counter 11, over lead 65, and to deliver a shaped output impulse to lead 31, principally for the actuation of gate control 29, thus corresponding in circuit position and function to output circuit 20, previously described. In circuit 90, the impulse-shaping elements 91, 92 and 93, corresponding, respectively, to elements 61, 62 and 63 of circuit 20, are preceded by a buffer stage 95 comprising a flip-flop identical with those of the counting stages of counter 11 and similarly operable from one state to the other by the application of a negative input impulse, in this case to lead 65. The plate circuit potentials of triodes 97A, 97B of buffer stage 95 are supplied by way of lead 60 and are therefore under the control of cathode follower 59 for purposes of state change, again as in the case of the counting stages.

The function of buffer stage 95 is to prevent a spurious output impulse, not signifying the completion of read-out, being delivered to lead 31 upon the occurrence of the general state change, when the stored count is more than half the capacity of the counter. It will be apparent that when the count exceeds half this capacity, the binary digit registered by the last counting stage, 19, will always be unity. Consequently, upon state change, with the transition of this digit to zero, an impulse will appear on lead 65, as described in connection with the counting stages, and in turn produce a signal or impulse on lead 31. While the latter impulse normally will not affect gate control 29 (assumed to be in the "off" condition during state change) in applications where a signal on lead 31 is used for purposes other than the actuation of gate control 29, the occurrence of such a spurious impulse may be detrimental.

In the operation of this modification of the invention, assuming that the counting capacity of the counter is not exceeded, buffer stage 95 will remain unoperated, or in its zero condition, during read-in of the count. When state change occurs, stage 95 is reversed, along with the counting stages. Subsequently, as the read-out impulses are applied to the counter and the capacity of the counter eventually is exceeded by one unit, (assuming this to be the chosen method of signalling the termination of read-out) an impulse is supplied to lead 65 which, in the present instance, reverses the state of stage 95. Reversal of state, from an operated to an unoperated condition, (using these terms as defined in connection with the counting stages) causes stage 95 to put out an impulse to shaping means 91, 92, 93, and thence to lead 31. Read-out, therefore, is accomplished in the same manner when a buffer stage is part of the output circuit as when such a stage is not included.

While preferred embodiments and methods of operation of the invention have been described herein, it is to be understood that these are by way of example, only, and not by way of limitation, the invention being limited only by the appended claims.

We claim:

1. In digital computers and the like the combination of a multi-stage counter, each stage being bi-valued for the registration of the digits of corresponding places of a binary number, means for applying a train of waves to said counter to register a count thereof, means for reversing the digital values of each of said stages after registration of said count, and means for obtaining a measure of the difference between a number registered by the counter and the counting capacity of the counter by applying input impulses causing capacity registration of the counter and obtaining a measure of the number of said impulses.

2. In digital computers and the like means for storing and reading out a count of electrical impulses comprising in combination a cyclically operable counter having plural stages of bi-stable counting circuits, corresponding, respectively to the places of a binary number and operable to register and store a registration in binary form of a count of impulses applied as an input thereto, circuit means for effecting a change of state of all said stages from the state thereof after storage of said impulses to a state representing the complement of the number of said impulses with regard to the capacity of said counter, means for applying a train of input impulses to the counter, means for terminating said train responsive to the counter passing by one unit its counting capacity, and means for obtaining a measure of the number of impulses in said train.

3. In electrical counting apparatus the combination of a binary counter for registering a count of electrical impulses having plural counting stages each incorporating a bi-stable circuit operable from one stable state to the other by the application of a single electrical reversing impulse of suitable character thereto, means for applying a train of waves to said counter to register a count thereof, means for generating reversing impulses of said character, circuit means for simultaneously applying an impulse of said character to each of said bi-stable circuits for reversing the state thereof after registration of said count, means for applying input impulses to operate the counter to capacity, and means sensitive to capacity registration for terminating the operation of said last means.

4. In counting apparatus the combination of a counter having plural bi-valued counting stages corresponding, respectively, to the places of a binary number and operable to register and store a registration in binary form of a count of selected electrical impulses, means for applying a train of waves to said counter to register a count thereof, means for simultaneously reversing the registered values of each of said stages after registration of said count, means for supplying a sequence of impulses to said counter for counting thereby and means for terminating the operation of said last means responsive to an accumulated count of said last impulses in excess of the capacity of the counter.

5. Means for effecting a change of scale in the presentation of pulse duration data comprising means for deriving from a pulse having a first duration a plurality of waves at a first frequency constituting a train of said duration, a counter for registering in binary form a count of the number of waves in said train, said counter having a number of bi-valued counting stages defining the capacity thereof, means for reversing the values of each of said stages to obtain a registration of the complement of the count with respect to the capacity of the counter, means for measuring the difference between said complement and the capacity of the counter as the number of waves at a second frequency in a second train, and means operative for the duration of said second train for deriving a single pulse having the duration of said second train.

6. Multiplication means in digital computers and the like comprising in combination a source of electrical waves at a first frequency, a cyclically operable counter for registering in binary form a count of electrical impulses applied as an input thereto and for supplying an output upon passing its counting capacity, said counter having a number of bi-valued counting stages defining the capacity thereof, means governing the application of waves from said source to said counter, means for simultaneously reversing the values of all of said counting stages, a source of electrical waves at a second frequency, means governing the application of waves from said last source to said counter, and means responsive to said counter output for actuating said last means to terminate the application to the counter of waves at said second frequency.

7. In computing apparatus the combination of a source of uniformly spaced electrical waves at a first frequency, means for obtaining a train of said waves of a first duration, a multi-place binary counter having a maximum counting capacity, circuit means for applying said train to said counter for registering a count of the waves therein, means for operating said counter to reverse the digits registered in each place thereof, a source of uniformly spaced electrical waves at a second frequency, circuit means for applying waves at said second frequency to said counter for measuring the duration of a train of waves at said second frequency having a count equal to the difference between a number registered by the counter and said maximum capacity thereof.

8. The combination claimed in claim 7 wherein said last means for measuring the duration of a train of waves includes means for initiating a pulse of constant amplitude synchronously with the start of said train and for terminating said train and pulse simultaneously responsive to capacity registration of the counter.

9. In computing apparatus a multi-stage cyclically operable binary counter adapted to register and store a count of electrical impulses, means for applying impulses thereto, gating means regulating the application of said impulses to said counter to store a count therein, means for simultaneously reversing the digits respectively registered by the stages of said counter to obtain a registration of the complement of a count stored by the counter, a source of other impulses, second gating means for applying impulses from said source to said counter, means for actuating said second gating means to an open condition, and means for actuating said second gating means to a closed condition responsive to said counter passing its counting capacity by one unit.

10. The combination claimed in claim 9 wherein one of said two gating means comprises means whose open condition is dependent upon the duration of a unidirectional electrical impulse applied thereto.

References Cited in the file of this patent

UNITED STATES PATENTS

| | | |
|---|---|---|
| 2,403,873 | Mumma | July 9, 1946 |
| 2,405,597 | Miller | Aug. 13, 1946 |
| 2,502,360 | Williams | Mar. 28, 1950 |
| 2,514,036 | Dickinson | July 4, 1950 |
| 2,517,559 | Haigh et al. | Aug. 8, 1950 |
| 2,591,931 | Grosdoff | Apr. 8, 1952 |
| 2,669,388 | Fox | Feb. 16, 1954 |
| 2,703,202 | Cartwright | Mar. 1, 1955 |